United States Patent Office 3,485,790
Patented Dec. 23, 1969

3,485,790
FILLED ESTER-CONTAINING POLYMERS
George H. Potter, St. Albans, and Clyde J. Whitworth, Jr., and Nathan L. Zutty, Charleston, W. Va., assignors to Union Carbide Corporation, a corporation of New York
No Drawing. Filed June 29, 1965, Ser. No. 468,155
Int. Cl. C08f 45/04, 29/28
U.S. Cl. 260—41
12 Claims

ABSTRACT OF THE DISCLOSURE

Improved filled polymers are obtained by heating a mixture of an ester-containing polymer, a finely divided inorganic filler containing chemically bound water and an acidic or basic catalyst for a period of time sufficient to effect reaction between the polymer and the filler.

---

The invention relates to a process for producing improved filled polymers and to the improved filled polymeric compositions that are produced thereby. In a particular aspect, the invention relates to a process which comprises heating a mixture of an ester-containing polymer, a filler, and a catalyst. In another aspect, the invention relates to the compositions that are produced by the process of the invention.

Ester-containing polymers such as ethylene-vinyl acetate copolymer or ethylene-ethyl acrylate copolymer can be improved in heat resistance, stiffness, and other properties by adding certain reactive fillers such as colloidal silica to the polymers. The present invention is based upon the discovery that properties of esteh-containing polymess that contain reactive fillers ian be further improved by empolying a catalyst when the filler is added to the polymer. Accordingly, the process of the invention comprises mixing an ester-containing polymer, a reactive filler, and a catalyst, for a period of time and at a temperature sufficient to effect a reaction between said polymer and said filler, and recovering the filled polymeric composition produced thereby.

The improved, filled polymeric compositions of the invention have one or more of the following characteristics:
 (a) Improved high temperature resistance,
 (b) Improved water and organic solvent resistance,
 (c) Improved electrical properties,
 (d) Higher tensile strength, and the like.

The polymers that are employed in the invention are the ester-containing thermoplstic polymers wherein the ester group is in a side group that is bonded to a polymeric chain composed of carbon-to-carbon bonds. Among the useful ester-containing polymers are those that contain polymerized vinyl acetate. For example, vinyl acetate homopolymers and vinyl acetate copolymers with one or more comonomers that are polymerizable along with vinyl acetate are useful. Among the vinyl acetate polymers contemplated are vinyl acetate homopolymer, vinyl acetate-ethylene copolymer, vinyl chloride-vinyl acetate copolymer, vinyl chloride-vinyl acetate-vinyl alcohol copolymer, vinyl chloride-vinyl acetate-maleic anhydride copolymer, styrene-vinyl acetate copolymer, vinyl chloride-vinylidene chloride-vinyl acetate copolymer, vinyl acetate-acrylonitrile copolymer, and the like. Vinyl acetate polymers that deserve particular mention are vinyl acetate homopolymer, ethylene-vinyl acetate copolymer and vinyl chloride-vinyl acetate copolymer. Ethylene-vinyl acetate copolymers are preferred.

The ester-containing thermoplastic polymer can be a homopolymer or a copolymer of an acrylic or a methacrylic acid ester. Specific illustrative examples include ethylene-ethyl acrylate copolymers, ethylene-methyl methacrylate copolymer, ethyl acrylate-methyl acrylate-vinyl acetate copolymer, ethyl acrylate-acrylonitrile copolymer, 2-ethylhexyl acrylate-acrylonitrile-ethyl acrylate copolymer, ethyl acrylate-dimethyl maleate-acrylonitrile copolymer, ethyl acrylate-octyldecyl methacrylate-acrylonitrile copolymer, methyl methacrylate-styrene-acrylonitrile copolymer, ethyl acrylate-vinyl chloride-acrylonitrile copolymer, butyl acrylate-vinylidene chloride copolymer, 2-methoxyethyl acrylate-acrylonitrile copolymer, 2-butoxyethyl acrylate-acrylonitrile copolymer, and the like. Many other ester-containing polymers are useful. For instance, ethylene-butyl maleate copolymer, ethylene-butyl fumarate copolymer, and the like are useful in the invention.

The preferred thermoplastic ester-containing polymers are copolymers of ethylene and one or more of vinyl acetate, alkyl acrylates wherein preferably the alkyl has up to 18 carbon atoms, alkyl methacrylates wherein preferably the alkyl has up to 18 carbon atoms, and alkyl maleates or fumarates wherein preferably the alkyl has up to 18 carbon atoms. Normally the thermoplastic ester-containing polymer will contain at least about 5 weight percent of the ester-containing monomer (in polymerized form), and preferably at least 15 weight percent of the ester-containing monomer, percentages being based upon weight of polymer. The molecular weight of the ester-containing polymer is such that the polymer is normally solid at room temperature (i.e., about 23° C.). The molecular weights of many of the thermoplastic ester-containing polymers that are useful in the invention can be further characterized by Melt Index as determined by the procedure described in ASTM D-1238-57T. Many of the polymers will have Melt Index values in the range of from about 0.1 to about 400, and preferably from about 0.5 to about 100.

Many other polymers can be employed in conjunction with the thermoplastic ester-containing polymer. Specific illustrative examples include polyethylene, polypropylene, ethylene-propylene copolymer, poly(vinyl chloride), vinyl chloride-acrylonitrile copolymer, polyacrylonitrile, ethylene-acrylonitrile copolymer, polyamides such as nylon 6, nylon 6/6, and the like, polyethylene terephthalate and other polyesters, the polyhydroxy ether produced by reacting equimolar proportions of 3-chloro-1,2-epoxypropane and the disodium salt of 2,2-bis(4-hydroxyphenyl)-propane, and the like.

The filler that is employed in the invention can be one or more of colloidal silica, certain clays, certain aluminas, asbestos, and the like.

The silica that is employed in the invention is a finely divided silica having a surface layer of hydroxyl groups. The commercially available silicas that are useful in the invention are known to the art as colloidal silicas. Such silicas are composed of particles that have their maximum dimension in the range of from about 0.001 micron to about 0.1 micron, and have a specific surface area of at least about 100 square meters per gram, and preferably at least about 150 square meters per gram. The specific surface area can be measured by nitrogen adsorption in accordance with the method described in the article "A New Method for Measuring Surface Areas of Finely Divided Materials and for Determining the Size of Particles" by P. H. Emmett, in the publication "Symposium On New Methods for Particle Size Determination in the Sub-Sieve Range," published by the American Society For Testing Materials, Mar. 4, 1941.

The individual silica particles, which have their greatest dimension in the range of from about 0.001 to about 0.1 micron, can be in the form of aggregates having a much larger dimension. These aggregates are broken down when the silica is mixed with the other materials to form the compositions of the invention. The surface layer of hydroxyl groups on the silica particles are chemically bound to the silica. There is thus provided a monomolecular layer of silanol groups on the surface of the silica particles.

The preparation of finely divided silica having a surface layer of hydroxyl groups can be by various methods known to the art. For instance, any of the following three procedures can be used to produce the silica that is used in the invention:

(1) A silica aerogel may be formed by gelling silicic acid in an alcohol-water solution and then converting the gel to an aerogel. This may be carried out by replacing most of the water of the gel with alcohol, heating the gel in an autoclave above the critical temperature of alcohol so that there is no meniscus between the liquid and gas phases and venting the vapors. In this way the liquid phase is removed without subjecting the gelled structure to the compressive forces due to the surface tension of the liquid-gas interface. A pulverized light fluffy powder of silica particles may then be formed by pulverizing the dry aerogel.

(2) Colloidal silicas may be prepared by vaporizing silicon dioxide at high temperature or producing silicon-containing vapor by burning ethyl silicate or silicon tetrachloride and thereafter collecting the "silica fume."

(3) Still another technique of preparing colloidal silicas is to precipitate silica from aqueous solution in such form that it can be dried to give a fine powder.

Additional descriptions of the nature and production of finely divided silica having a surface layer of hydroxyl groups can be found in the laterature. One such source is "The Colloid Chemistry of Silica and Silicates" by Ralph K. Iler (published in 1955).

Certain clays are useful as fillers in the invention. The clays that are useful in the invention are the colloidal grades having a specific surface area of at least about 150 square meters per gram and which have an average particle size of less than 1 micron. As is well known in the art, the exact composition of clays vary depending upon their source, but they are normally hydrated silicates of aluminum, magnesium, or iron or mixtures thereof. The preferred clays are those that are predominantly hydrated magnesium aluminum silicates.

Hydrated aluminum oxide having a particle size such that the largest dimension is less than about 1 micron is useful as a filler in the invention.

Another filler that is useful in the invention is asbestos, preferably chrysotile asbestos.

The preferred filler for use in the invention is colloidal silica.

The discussion above points out that there are many different fillers that can be employed in the invention. The one feature that all of these fillers have in common, apart from small particle size, is that they are inorganic compositions that contain chemically bound water. Apparently, hydroxyl groups provided by the water react with the ester groups of the ester-containing polymer to thereby form a bond from the filler to the polymer. Chemically bound water is contrasted with moisture in that chemically bound water is not released until the filler is heated to a temperature above about 500°–600° C., while moisture is driven off at the boiling point of water.

The catalysts which have been found to promote the reaction between the filler and the thermoplastic ester-containing polymer are the non-neutral compositions, i.e., the acids and the bases. Any substance which is an acid or a base under either the Bronsted-Lowry theory (proton-transfer system) or the Lewis theory (electron-pair system) can be employed as a catalyst in the invention. Among the useful catalysts are found the phosphite esters, the titanate esters, certain organic tin compounds, proton acids (i.e., compounds that contain an acidic hydrogen atom), amines, alkali metal hydroxides and alkoxides, alkaline earth metal hydroxides and alkoxides, and many other classes of compounds that are either acids or bases. Specific illustrative phosphite esters include ethyl dihydrogen phosphite, decyl dihydrogen phosphite, phenyl dihydrogen phosphite, stearyl dihydrogen phosphite, diethyl hydrogen phosphite, di(2-ethylhexyl) hydrogen phosphite, diphenyl hydrogen phosphite, dibenzyl hydrogen phosphite, ditolyl hydrogen phosphite, dicyclohexyl hydrogen phosphite, trimethyl phosphite, triethyl phosphite, tripropyl phosphite, triisopropyl phosphite, tributyl phosphite, triisobutyl phosphite, tripentyl phosphite, triheptyl phosphite, trihexyl phosphite, trioctyl phosphite, trinonyl phosphite, tridecyl phosphite, triisodecyl phosphite, tridodecyl phosphite, trioctadecyl phosphite, tricyclohexyl phosphite, diethyl butyl phosphite, tribenzyl phosphite, triphenyl phosphite, tri-1-naphthyl phosphite tri-2-naphthyl phosphite, tri-1-anthryl phosphite, phenyl dimethyl phosphite, phenyl diethyl phosphite, phenyl dipropyl phosphite, phenyl dibutyl phosphite, phenyl dipentyl phosphite, phenyl diheptyl phosphite, phenyl dihexyl phosphite, phenyl dioctyl phosphite, phenyl dinonyl phosphite, phenyl didecyl phosphite, phenyl triisodecyl phosphite, phenyl didodecyl phosphite, 1-naphthyl didecyl phosphite, diphenyl methyl phosphite, diphenyl ethyl phosphite, diphenyl propyl phosphite, diphenyl butyl phosphite, diphenyl isobutyl phosphite, diphenyl pentyl phosphite, diphenyl heptyl phosphite, diphenyl hexyl phosphite, diphenyl octyl phosphite, diphenyl nonyl phosphite, diphenyl decyl phosphite, diphenyl isodecyl phosphite, diphenyl dodecyl phosphite, di-1-anthryl ethyl phosphite, triethylene diphosphite, i.e., the compound having the formula

tripropylene diphosphite, tributylene diphosphite, and the like. Many of the phosphites that can be employed in the invention can be represented by Formula I:

I 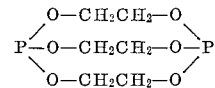

wherein each R individually can be hydrogen, alkyl, aryl, alkaryl, aralkyl, cycloalkyl, alkylene phosphite, and the like, provided that at least one R represents an organic group. Preferably, all three R groups represent organic groups. Normally, R will represent a group having not more than about 18 carbon atoms.

The catalyst can also be a titanate ester. Specific illustrative examples include tetramethyl titanate, tetraethyl titanate, tetraisopropyl titanate, tetrabutyl titanate, tetraoctyl titanate, tetra(2-ethyl-1,3-hexanediol) titanate, and other alkyl titanate esters wherein the alkyl groups have up to 18 carbon atoms.

Many organic tin compounds can be employed in the invention. Among the organic tin compounds that can be used are the stannous salts of alkanoic acids such as stannous octoate, stannous acetate, stannous laurate, stannous stearate, and the like. Also, the organotin compounds can be employed. Such compounds have at least one direct carbon-to-tin bond, and preferably, at least one bond to oxygen, sulfur, nitrogen, halogen, phosphorus, or hydrogen. Specific illustrative examples of useful organo-tin compounds include the following compositions:

(A) Tin compounds having four carbon to tin bonds such as tetramethyltin, tetraethyltin, tetrapropyltin, tetrabutyltin, tetraoctyltin, tetralauryltin, tetrabenzyltin, tetrakis(2-phenylethyl)tin, tetraphenyltin, tetraparatolyltin, tetravinyltin, tetraallyltin, tetrachloromethyltin, tetramethanesulfonylmethyltin, tetra-para-methoxy-phenyltin, tetra-paranitrophenyltin, as well as unsymmetrical compounds as exemplified by 2-cyanoethyl-tributyltin, dibutyldiphenyltin and various addition products of alkyl, aryl and aralkyltin hydrides with unsaturated organic compounds such as acrylonitrile, allyl cyanide, crotonitrile, acrylamide, methyl acrylate, allyl alcohol, acroleindiethyl acetal, vinyl acetate, styrene, and the like;

(B) Tin compounds having $n$ carbon to tin bonds and $4-n$ bonds from tin to halogen or hydrogen atoms or hydroxyl groups in which $n$ is an integer in the range of from 1 to 3, such as trimethyltin chloride, tributyltinchloride, trioctyltin chloride, triphenyltin chloride, trimethyltin bromide, tributyltin fluoride, triallyltin chloride, tributyltin hydride, triphenyltin hydride, trimethyltin hydroxide, tributyltin hydroxide, dimethyltin dichloride, dibutyltin dichloride, dioctyltin dichloride, bis(2-phenylethyl)tin dichloride, diphenyltin dichloride, divinyltin dichloride, diallyltin dibromide, diallyltin diiodide, dibutyltin difluoride, bis(carboethoxymethyl)tin diiodide, bis(1,3-diketopentane)tin dichloride, dibutyltin dihydride, butyltin trichloride and octyltin trichloride;

(C) Tin compounds having two carbon to tin bonds and a double bond from tin to oxygen or sulfur, such as dimethyltin oxide, diethyltin oxide, dibutyltin oxide, dioctyltin oxide, dilauryltin oxide, diphenyltin oxide and diallyltin oxide, all prepared by hydrolysis of the corresponding dihalides, as well as bis-2-phenylethyltin oxide, $$[HOOC(CH_2)_5]_2SnO.$$

$$[CH_3OCH_2(CH_2OCH_2)_{x-1}CH_2]_2SnO$$

$$[CH_3OCH_2(CH_2OCH_2)_{x-1}CH_2O(CH_2)_5]_2SnO$$

and dibutyltin sulfide, the $x$'s being whole integers;

(D) Tin compounds having $n$ carbon to tin bonds and $4-n$ bonds from tin to oxygen, sulfur, nitrogen or phosphorus linking organic radicals, $n$ being an integer from 1 to 3, such as tributyltin methoxide, tributyltin butoxide, tributyltin acetate, tributyltin N-piperazinylthiocarbonylmercaptide, tributyltin phosphorus dibutoxide [prepared as indicated immediately below:

$$2(C_4H_9O)_3P + PCl_3 \longrightarrow 3(C_4H_9O)_2PCl$$

$$(C_4H_9)_3SnCl + 2Na \longrightarrow (C_4H_9)_3SnNa + NaCl$$

$$(C_4H_9)_3SnNa + (C_4H_9O)_2PCl \xrightarrow{NH_3} (C_4H_9)_3SnP(OC_4H_9)_2 + NaCl$$

dibutyltin dibutoxide, $$(C_4H_9)_2Sn[OCH_2(CH_2OCH_2)_{x-1}CH_2CH_3]_2$$

dibutyl bis(O-acetylacetonyl)tin, dibutyltin bis(octyl maleate), dibutyltin bis(thiododecoxide), dibutyltin bis(octyl thioglycolate), dibutyltin bis(N-morpholinylcarbonylmethylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinylthiocarbonylmercaptide), dioctyltin bis(N-piperazinylthiocarbonylmercaptide), octyltin tris(thiobutoxide), butyltin triacetate, methylstannonic acid, ethylstannonic acid, butylstannonic acid, octylstannonic acid, $$HOOC(CH_2)_5\text{-}SnOOH, \quad (CH_3)_3N(CH_2)_5SnOOH$$

$$CH_3OCH_2(CH_2OCH_2)_{x-1}CH_2SnOOH$$

and $$CH_3OCH_2(CH_2OCH_2)_{x-1}CH_2O(CH_2)_5SnOOH$$

in which the $x$'s are positive integers.

(E) Polystannic compounds having carbon to tin bonds and preferably also bonds from tin to halogen, hydrogen, oxygen, sulfur, nitrogen or phosphorus, such as $$HOOSn(CH_2)_xSnOOH$$

and $$HOOSnCH_2(CH_2OCH_2)_xCH_2SnOOH$$

the $x$'s being positive integers, bis-trimethyltin, bis-triphenyltin, bis-tributyl distannoxane, dibutyltin basic laurate, dibutyltin basic hexoxide and other polymeric organo-tin compounds containing carbon to tin bonds and preferably also bonds, e.g., those having repeating

groups, dimers and trimers of $(R_2SnY)_n$ and the like in which the R's may be alkyl, aryl or aralkyl radicals and the Y's are chalcogens, as well as many other organo-tin compounds heretofore proposed as heat and light stabilizers for chlorinated polymers and available commercially for this purpose.

The preferred tin compounds are the stannous alkanoates and the dialkyltin compounds that also have two valence bonds from tin to oxygen.

The catalyst employed in the invention can also be an amine or an amine derivative. Specific illustrative examples include tertiary amines such as 1,4-diazabicyclo[2.2.2]octane, bis[2-(N,N-dimethylamino)ethyl] ether, triethylamine, and the like, strong bases such as guanidine, quaternary ammonium compounds, and the like. The preferred amines are the tertiary amines.

Proton acids are also useful as catalysts in the invention. Specific illustrative examples include benzene-sulfonic acid, toluene sulfonic acid, phosphoric acid, sulfuric acid, hydrogen chloride, and the like. The arylsulfonic acids are the preferred proton acids.

Other acids that are useful as catalysts in the invention include boron trifluoride (usually as a complex with diethyl ether or an amine), titanium tetrachloride, ferric chloride, stannous chloride, stannic chloride, aluminum chloride, and the like.

A further class of useful catalysts includes the alkali metal and alkaline earth metal alkoxides and hydroxides. Specific illustrative examples of these materials include sodium methoxide, sodium ethoxide, sodium isopropoxide, potassium ethoxide, potassium butoxide, magnesium methoxide, calcium ethoxide, barium propoxide, lithium methoxide, sodium hydroxide, potassium hydroxide, lithium hydroxide, calcium hydroxide, magnesium hydroxide, and the like. The alkali metal alkoxides are preferred.

The process of the invention comprises heating a mixture of an ester-containing polymer, a filler, and a catalyst for a period of time sufficient to effect reaction between the polymer and the filler. The proportion of the components can vary widely. For example, the filler can be employed in quantities of at least about 1 weight percent, and preferably at least about 10 weight percent, based on weight of filler plus polymer. More preferred proportions of filler are found within the range of from about 20 to about 70 weight percent, based on weight of polymer plus filler. It is rare that the filler will be employed in proportions of more than about 80 weight percent, based on weight of polymer plus filler.

The catalyst is employed in catalytic quantities sufficient to promote the reaction between polymer and filler. For example, useful proportions of catalyst are found in the range of from about 0.1 weight percent, and lower, to about 8 weight percent, and higher, based on weight of polymer plus filler. Preferred proportions are found in the range of from about 0.3 to about 5 weight percent of catalyst, based on weight of polymer plus filler.

The process of the invention is carried out at an elevated temperature for a period of time sufficient to effect reaction between the polymer and the filler. For example, a reaction temperature in excess of about 90° C., and preferably in excess of about 110° C., is useful. Normally, the temperature will not be in excess of about 250° C. Reaction times of from about 5 minutes to 3 hours or more are useful. Preferred times are found within the range of from about 10 minutes to about 1 hour.

The process of the invention can be carried out by mixing the polymer, filler, and catalyst in a heated mill, Banbury mixer, extruder, or the like, in order to insure intimate mixing of the components. The mixture can then be molded, or the like, if desired, in order to produce the finished product.

The process of the invention is useful for producing molded articles having wide utility. In addition, the process of the invention can be employed to produce extruded coatings and other materials whose utility is enhanced by the improved properties that are the results of the practice of the invention.

The examples which follow illustrate various aspects of the invention.

EXAMPLES 1–34

To a 6″ x 12″ two-roll mill that was maintained at 120°–130° C., there was added 150 grams of Polymer A (an ethylene-vinyl acetate copolymer which has a Melt Index of 22 and which contains 28 weight percent vinyl acetate) and 1.5 grams of stearic acid (as a mill lubricant). To this polymer, there was added over a 5 to 10 minute period 150 grams of Silica A (a colloidal silica having an ultimate particle size of about 0.025 micron and having a specific surface area of about 110 square meters/gram). After the silica had been added, 5 milliliters of tetraisopropyl titanate was added. The mixture was then milled for 15 minutes at 120°–140° C. The mixture was then sheeted off and a portion was molded at 185° C. and about 5000 p.s.i. for 15 minutes. The properties of molded composition are listed in Table I, below.

By procedures analogous to that described above, a series of ester-containing polymers filled with Silica A were prepared using various catalysts. The polymers and catalysts employed were as follows:

Catalysts:
  TIPT—Tetraisopropyl titanate.
  OGT—Octylene glycol titanate (duPont-TYZOR OG organic titanate) (i.e., tetra[2-ethyl-1,3-hexanediol]titanate).
  EGP—Triethylene diphosphite.
  TPP—Triphenyl phosphite.
  DPPD—Diphenyl pentaerythritol diphosphite.
  D-22—Dibutyltin dilaurate.
  D-14—Dibutyltin laurate maleate.
  D-15—Dibutyltin dimaleate.
  PTSA—p-Toluene sulfonic acid.
  DABCO—1,4-diazabicyclo[2.2.2]octane.
  $BF_3$—Boron trifluoride-etherate.
  $NaOCH_3$—Sodium methoxide.
  CaO—Calcium oxide.

Polymers:
  Polymer A—Ethylene/vinyl acetate copolymer (Melt Index=22) containing 28 weight percent vinyl acetate.
  Polymer B—Ethylene/ethyl acrylate copolymer (Melt Index=2) containing 18 weight percent ethyl acrylate.
  Polymer C—Medium molecular weight poly(vinyl acetate).
  Polymer D—Ethylene/butyl maleate copolymer (Melt Index=24.0, weight percent butyl maleate=30.3).
  Polymer E—Ethylene/butyl fumarate copolymer (Melt Index=8.9, weight percent butyl fumarate=29.1).

Representative properties of the compositions are displayed in Table I, which follows.

TABLE I.—CATALYSTS FOR THE INTERACTION OF REACTIVE FILLERS WITH ESTER-CONTAINING POLYMERS

| Example | Catalyst | Cat. Conc., percent by Wt. | Polymer | Silica Filler, percent by Wt. | Percent Polymer Insoluble in Toluene [1] | Stiffness R.T. | Modulus 130° C., p.s.i. | Tensile Strength, p.s.i. | Percent Elongation |
|---|---|---|---|---|---|---|---|---|---|
| 1 | TIPT | 1.6 | A | 50 | 41.0 | 30,000 | 6,340 | 2,300 | 150 |
| 2 | TIPT | 1.6 | B | 50 | 41.2 | 42,000 | 2,940 | 2,370 | 40 |
| 3 | TIPT | 1.9 | C | 40 | 32.0 | 325,000 | 2,850 | 2,600 | 8 |
| 4 | TIPT | 1.6 | 70/30; A/C | 50 | 32.8 | 100,000 | 10,000 | 2,400 | 8 |
| 5 | TIPT | 3.3 | 70/30; A/C | 50 | 28.4 | 110,000 | 6,580 | 2,300 | 8 |
| 6 | TIPT | 4.9 | 70/30; A/C | 50 | 31.6 | 105,000 | 8,890 | 2,495 | 9 |
| 7 | OGT | 1.6 | A | 50 | 50.2 | 32,000 | 1,885 | 2,750 | 170 |
| 8 | OGT | 2.1 | 70/30; A/C | 50 | 30.0 | 69,000 | 4,810 | 2,160 | 16 |
| 9 | EGP | 2.2 | A | 50 | 29.8 | 44,000 | 7,023 | 2,280 | 150 |
| 10 | EGP | 2.6 | C | 40 | 25.2 | 195,000 | 9,200 | 890 | 0.4 |
| 11 | TPP | 2.0 | A | 50 | 42.0 | 32,000 | 6,330 | 1,970 | 230 |
| | TPP [2] | 2.0 | A | 50 | 47.2 | 36,000 | 4,060 | 1,950 | 160 |
| 12 | TPP | 2.1 | D | 45 | 14.5 | 42,000 | 10,100 | 1,500 | 8 |
| 13 | TPP | 2.0 | E | 50 | 18.4 | 58,000 | 9,160 | 2,425 | 10 |
| 14 | DPPD | 1.7 | A | 50 | 31.8 | 40,000 | 12,100 | 1,970 | 130 |
| 15 | D-22 | 1.7 | A | 50 | 23.4 | 37,000 | 4,790 | 1,970 | 120 |
| 16 | D-14 | 1.7 | A | 50 | 31.8 | 42,000 | 7,540 | 1,960 | 50 |
| 17 | D-15 | 1.7 | A | 50 | 27.6 | 44,000 | 8,100 | 1,970 | 85 |
| 18 | $BF_3$ | 1.7 | 70/30; A/C | 50 | 20.2 | 96,000 | 7,060 | 2,650 | — |
| 19 | PTSA | 1.7 | 70/30; A/C | 50 | 29.4 | 76,000 | 7,200 | 2,200 | 10 |
| 20 | PTSA | 1.7 | B | 50 | 11.2 | 55,000 | 5,260 | 2,450 | 20 |
| 21 | $NaOCH_3$ | 1.7 | 70/30; A/C | 50 | 29.2 | 84,000 | 5,120 | 2,200 | 9 |
| 22 | $NaOCH_3$ | 1.7 | B | 50 | 27.8 | 57,000 | 6,085 | 2,950 | 32 |
| 23 | $NaOCH_3$ | 1.7 | D | 45 | 25.1 | 47,000 | 4,185 | 1,760 | 3 |
| 24 | DABCO | 1.7 | A | 50 | 28.6 | 39,000 | 6,590 | 2,460 | 210 |
| 25 | DABCO | 1.7 | B | 50 | 27.4 | 55,200 | 4,645 | 1,900 | 60 |
| 26 | CaO | 1.7 | A | 50 | 35.7 | 34,000 | 3,960 | 2,825 | 150 |
| 27 | $(CH_4)_4N^+OH^-$(aq) [3] | 1.7 | 70/30; A/C | 50 | 22.2 | 74,000 | 6,740 | 2,300 | 8 |
| 28 [2] | | | A | 50 | 30.4 | 33,000 | 4,900 | 2,500 | 250 |
| 29 [2] | | | 90/10; A/C | 50 | 28.4 | 53,000 | 4,960 | 1,450 | 23 |
| 30 [2] | | | 70/30; A/C | 50 | 23.2 | 96,000 | 6,400 | 2,150 | 1 |
| 31 | | | C | 40 | 16.3 | 280,000 | 4,037 | 4,151 | 2 |
| 32 | | | B | 50 | 15.8 | 50,000 | 2,760 | 1,900 | 45 |
| 33 | | | D | 45 | 20.0 | 48,000 | [4] | 1,750 | 8 |
| 34 | | | E | 50 | 10.0 | 54,000 | 2,700 | 1,825 | 7 |

[1] Soxhlet extraction for 24 hours in refluxing toluene; percent based on weight of polymer.
[2] These samples were molded for 30 minutes.
[3] 1.7 percent of an aqueous solution containing 10 percent tetramethyl ammonium hydroxide.
[4] No load.

EXAMPLES 35–52

A series of ester-containing polymers were filled with various fillers by procedures analogous to that described above for Examples 1–34. Table II, below, displays the various ester-containing polymers, fillers, and catalysts that were employed, as well as representative properties. The fillers that were employed are as follows:

Asbestos—short fiber chrysotile asbestos.

Leached Asbestos—prepared in accordance with the following procedure: To a 5-liter three-necked, stirred flask was charged 200 gm. of chrysotile asbestos and 4,430 ml. of 1.0 N HCl. After heating (101° C.) for three hours the mixture was allowed to cool and then filtered.

The leached asbestos was washed three times with water and dried in a vacuum oven at 60–65° C. Weight recovered=86.2 gm. This process removes substantially all the magnesium from the asbestos leaving a very porous silica residue.

Clay A—An attapulgus clay having an average particle size of 0.14 micron and a specific surface of about 210 square meters per gram.

Clay B—An attapulgus clay having an average particle size of 0.12 micron and a specific surface area of about 210 square meters per gram.

Alumina A—A powdered alumina consisting of minute fibrils of boehmite alumina. The average chemical composition is as follows: AlOOH—83.1 percent; $CH_3COOH$—9.8 percent; $SO_4$—1.7 percent; Water—5.0 percent. Alumina A has a specific surface area of 274 square meters per gram.

Alumina B—A hydrated alumina having a specific surface area of 18–24 square meters per gram and an average particle size of about 0.35–0.4 micron.

2. The process of claim 1 wherein said process is carried out at a temperature in the range of from about 90° C. to about 250° C. for a period of from about 5 minutes to about 3 hours.

3. The process of claim 1 wherein the thermoplastic, ester-containing polymer is a copolymer of ethylene with a member of the group consisting of vinyl acetate, alkyl acrylate, alkyl methacrylate, alkyl maleate, and alkyl fumarate.

4. The process of claim 1 wherein the thermoplastic, ester-containing polymer is poly(vinyl acetate).

5. The process of claim 1 wherein the phosphite is triethylene diphosphite.

6. The process of claim 1 wherein the phosphite is triphenyl phosphite.

7. The process of claim 12 wherein the catalyst is tetraisopropyl titanate.

8. Process which comprises heating at a temperature in excess of about 90° C. a mixture of:
    (a) an ethylene-vinyl acetate copolymer,

TABLE II

| Example | Catalyst | Cat. Conc. (percent by Wt.) | Ester Containing Polymer | Filler (percent by Wt.) | Percent Polymer Insoluble in Refluxing Toluene | Stiffness Modulus, p.s.i. R.T. | Stiffness Modulus, p.s.i. 130° C. | Tensile Strength, p.s.i. | Percent Elongation |
|---|---|---|---|---|---|---|---|---|---|
| 35 | | | B | Asbestos (50) | 13.8 | 25,000 | | 1,330 | 470 |
| 36 | TIPT | 1.6 | B | do | 28.8 | 45,000 | | 2,390 | 75 |
| 37 | DPPD | 1.7 | B | do | 9.8 | 54,000 | | 1,580 | 115 |
| 38 | | | A | do | 12.0 | 25,000 | | 1,140 | 110 |
| 39 | TIPT | 1.6 | A | do | 12.8 | 41,000 | | 1,880 | 100 |
| 40 | DPPD | 1.7 | A | do | 12.0 | 34,000 | | 1,180 | 180 |
| 41 | | | A | Leached Asbestos (50) | 35.2 | 36,000 | 5,230 | 1,600 | 10 |
| 42 | TIPT | 1.7 | A | do | 42.2 | 37,000 | 3,460 | 1,820 | 28 |
| 43 | | | A | Clay A (40) | 13.8 | 50,000 | 1,830 | 1,890 | 59 |
| 44 | EGP | 2.2 | A | do | 36.7 | 62,000 | 6,000 | 1,530 | 30 |
| 45 | | | A | Clay B (50) | 20.8 | 68,000 | 2,900 | 1,700 | 57 |
| 46 | TPP | 2.0 | A | do | 30.8 | 80,000 | 7,930 | 1,650 | 10 |
| 47 | | | B | Alumina A (50) | | 31,000 | No Load (160° C.) | 1,260 | 35 |
| 48 | TIPT | 1.7 | B | do | | 34,000 | 294 (160° C.) | 1,240 | 20 |
| 49 | | | A | Alumina B (50) | | 7,000 | No Load (100° C.) | 1,290 | 300 |
| 50 | TIPT | 1.7 | A | do | 9.6 | 9,000 | 52 (100° C.) | 1,570 | 260 |
| 51 | | | B | do | 11.6 | 22,500 | 53 (100° C.) | 1,300 | 80 |
| 52 | TIPT | 1.7 | B | do | 17.2 | 19,500 | 52 (100° C.) | 1,550 | 80 |

What is claimed is:

1. A process for producing improved filled polymers which comprises heating at a temperature in excess of about 90° C. a mixture of:
    (a) a thermoplastic, ester-containing polymer wherein said polymer has a polymeric chain of carbon-to-carbon bonds and wherein the ester groups are contained in side groups that are bonded to said polymeric chain,
    (b) a filler in an amount of from about 1 to about 80 percent by weight based on the total weight of polymer and filler, said filler containing chemically bound water and selected from the group consisting of silica having a specific area of at least about 100 square meters per gram, and a particle size of from about 0.001 to about 0.1 micron, clay having a specific surface area of at least about 150 square meters per gram, and an average particle size of less than 1 micron, hydrated aluminum oxide having a particle size such that the largest dimension is less than about 1 micron, and asbestos, and
    (c) from about 0.1 to about 8 percent by weight based on the total weight of polymer and filler of a catalyst which is a phosphite of the formula:

wherein each R individually is a member of the group consisting of hydrogen, alkyl, aryl, alkaryl, aralkyl, cycloalkyl, and alkylene phosphite, provided that at least one R is an organic group; for a period of time sufficient to effect a reaction between said thermoplastic, ester-containing polymer and said filler, said period of time being at least about 5 minutes.

(b) colloidal silica in an amount of from about 1 to about 80 percent by weight based on the total weight of copolymer and silica said colloidal silica having a surface layer of hydroxyl groups and having a specific surface area of at least about 100 square meters per gram, and a particle size of from about 0.001 to about 0.1 micron, and (c) from about 0.1 to about 8 percent by weight based on the total weight of the copolymer and silica of a phosphite of the formula

wherein each R individually is a member of the group consisting of hydrogen, alkyl, aryl, alkaryl, aralkyl, cycloalkyl, and alkylene phosphite, provided that at least one R is an organic group; for a period of time sufficient to effect a reaction between said ethylenevinyl acetate copolymer and said colloidal silica, said period of time being at least about 5 minutes.

9. Process which comprises heating at a temperature in excess of about 90° C. a mixture of:
    (a) an ethylene-vinyl acetate copolymer,
    (b) colloidal silica in an amount of from about 1 to about 80 percent by weight based on the total weight of copolymer and silica said colloidal silica having a surface layer of hydroxyl groups and having a specific surface area of at least about 100 square meters per gram, and a particle size of from about 0.001 to about 0.1 micron, and
    (c) from about 0.1 to about 8 percent by weight based on the total weight of the copolymer and silica of a tetraalkyl titanate;

for a period of time sufficient to effect a reaction between said ethylene-vinyl acetate copolymer and said colloidal silica, said period of time being at least 5 minutes.

10. Process which comprises heating at a temperature in excess of about 90° C. a mixture of:
(a) an ethylene-ethyl acrylate copolymer,
(b) colloidal silica in an amount of from about 1 to about 80 percent by weight based on the total weight of copolymer and silica said colloidal silica having a surface layer of hydroxyl groups and having a specific surface area of at least about 100 square meters per gram, and a particle size of from about 0.001 to about 0.1 micron, and
(c) from about 0.1 to about 8 percent by weight based on the total weight of the copolymer and silica of a phosphite of the formula

wherein each R individually is a member of the group consisting of hydrogen, alkyl, aryl, alkaryl, aralkyl, cycloalkyl, and alkylene phosphite, provided that at least one R is an organic group; for a period of time sufficient to effect a reaction between said ethylene-ethyl acrylate copolymer and said colloidal silica, said period of time being at least 5 minutes.

11. Process which comprises heating at a temperature in excess of about 90° C. a mixture of:
(a) an ethylene-ethyl acrylate copolymer,
(b) colloidal silica in an amount of from about 1 to about 80 percent by weight based on the total weight of copolymer and silica said colloidal silica having a surface layer of hydroxyl groups and having a specific surface area of at least about 100 square meters per gram, and a particle size of from about 0.001 to about 0.1 micron, and
(c) from about 0.1 to about 8 percent by weight based on the total weight of the copolymer and silica of a tetraalkyl titanate; for a period of time sufficient to effect a reaction between said ethylene-ethyl acrylate copolymer and said colloidal silica, said period of time being at least 5 minutes.

12. A process for producing improved filled polymers, which comprises heating at a temperature in excess of about 90° C. a mixture of (a) a thermoplastic, ester-containing polymer wherein said polymer has a polymeric chain of carbon-to-carbon bonds and wherein the ester groups are contained in side groups that are bonded to said polymeric chain,
(b) a filler in an amount of from about 1 to about 80 percent by weight based on the total weight of polymer and filler, said filler containing chemically bound water and selected from the group consisting of silica having a specific surface area of at least about 100 square meters per gram, and a particle size of from about 0.001 to about 0.1 micron, clay having a specific surface area of at least 150 square meters per gram, and an average particle size of less than 1 micron, hydrated aluminum oxide having a particle size such that the largest dimension is less than about 1 micron, and asbestos, and
(c) from about 0.1 to about 8 percent by weight based on the total weight of polymer and filler of a catalyst which is tetraalkyl titanate;

for a period of time sufficient to effect a reaction between said thermoplastic, ester-containing polymer and said filler, said period of time being at least about 5 minutes.

References Cited

UNITED STATES PATENTS

| | | | |
|---|---|---|---|
| 3,219,604 | 11/1965 | Fischer | 260—22 |
| 3,304,197 | 2/1967 | Pundsack et al. | |
| 3,350,475 | 10/1967 | Watanabe et al. | 260—865 |
| 3,377,311 | 4/1968 | Roch et al. | 260—37 |
| 3,061,577 | 10/1962 | Pruett | 260—41 |

OTHER REFERENCES

Schrader et al.: Modern Plastics, September 1967, Radioisotope Study of Coupling Agents in Reinforced Plastics, p. 195.

Gould: Inorganic Reactions and Structure, Holt Rinehart Winston—New York 1961, p. 127.

ALLAN LIEBERMAN, Primary Examiner

S. L. FOX, Assistant Examiner

U.S. Cl. X.R.

260—86.3, 86.7